United States Patent [19]

Petro

[11] Patent Number: 4,913,299
[45] Date of Patent: Apr. 3, 1990

[54] BACK-OFF RESISTANT CLOSURE FOR A CONTAINER

[75] Inventor: Richard J. Petro, Mokena, Ill.

[73] Assignee: Phoenix Closures, Inc., Naperville, Ill.

[21] Appl. No.: 332,623

[22] Filed: Apr. 3, 1989

[51] Int. Cl.$^4$ .............................................. B65D 41/04
[52] U.S. Cl. ..................................... 215/330; 215/216
[58] Field of Search ................................ 215/330, 216

[56] References Cited

U.S. PATENT DOCUMENTS

| | | | |
|---|---|---|---|
| 2,153,426 | 4/1939 | McNamara et al. | 215/330 X |
| 2,423,582 | 7/1947 | Coleman | 215/330 X |
| 2,980,275 | 4/1961 | Lundgren | 215/330 |
| 3,297,185 | 1/1967 | Plymale | 215/330 |
| 3,924,769 | 12/1975 | Fillmore | 215/330 X |
| 3,977,557 | 8/1976 | Hazard | 215/330 X |
| 3,980,195 | 9/1976 | Fillmore | 215/330 X |
| 4,134,513 | 1/1979 | Mumford | 215/216 |
| 4,275,817 | 6/1981 | Patton | 215/330 |
| 4,345,691 | 8/1982 | Burke | 215/330 |
| 4,461,394 | 7/1984 | Sendel et al. | 215/330 |
| 4,664,273 | 5/1987 | Simon | 215/216 |
| 4,674,643 | 6/1987 | Wilde et al. | 215/329 X |

FOREIGN PATENT DOCUMENTS 646323  9/1962  Italy ..................................... 215/330

*Primary Examiner*—Donald F. Norton
*Attorney, Agent, or Firm*—Welsh & Katz, Ltd.

[57] ABSTRACT

A back-off resistant closure for resealable engagement upon a container having a neck with a ring of outwardly projecting ratchet formations includes a generally planar top portion with a depending peripheral annular skirt, the skirt having a plurality of recess formations for matingly engaging the ratchet formations on the container neck, thus preventing unwanted backing-off of the closure from the container, as well as facilitating the removal of the finished closure from conventional injection molding machinery.

2 Claims, 3 Drawing Sheets

U.S. Patent    Apr. 3, 1990    Sheet 1 of 3    4,913,299
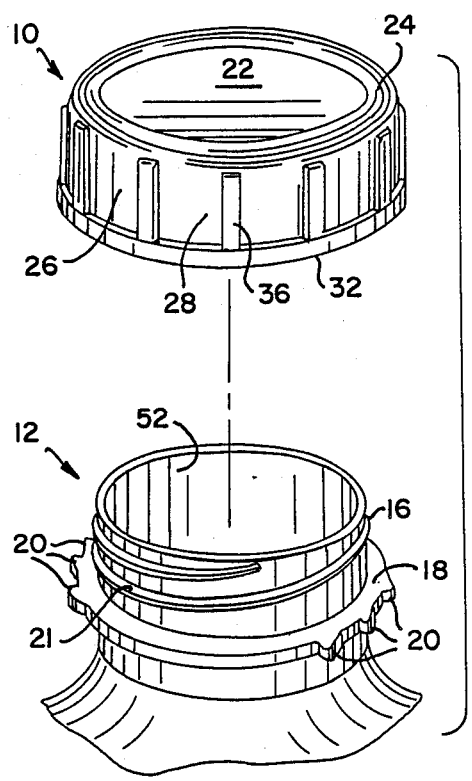
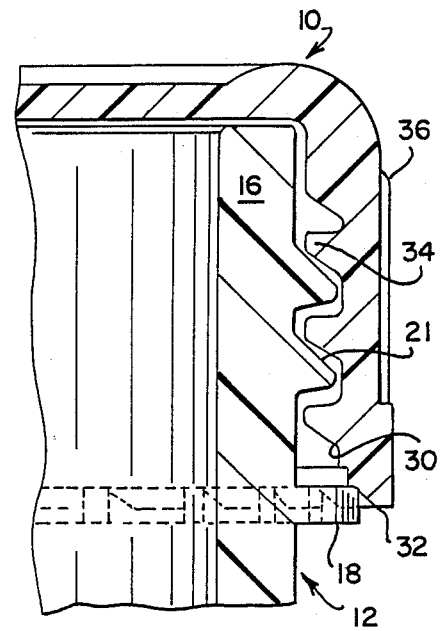
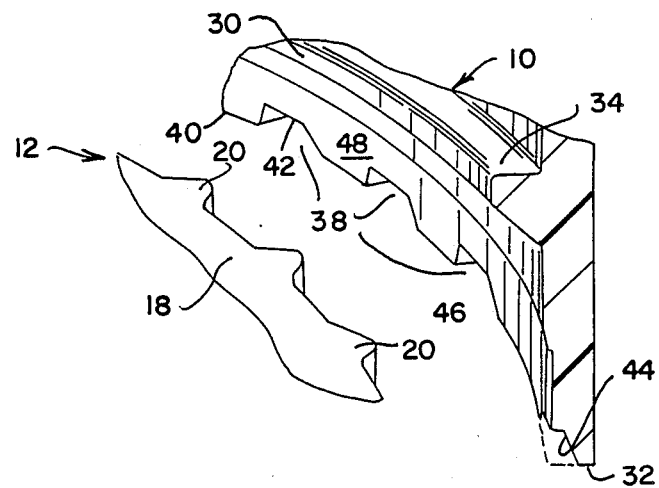

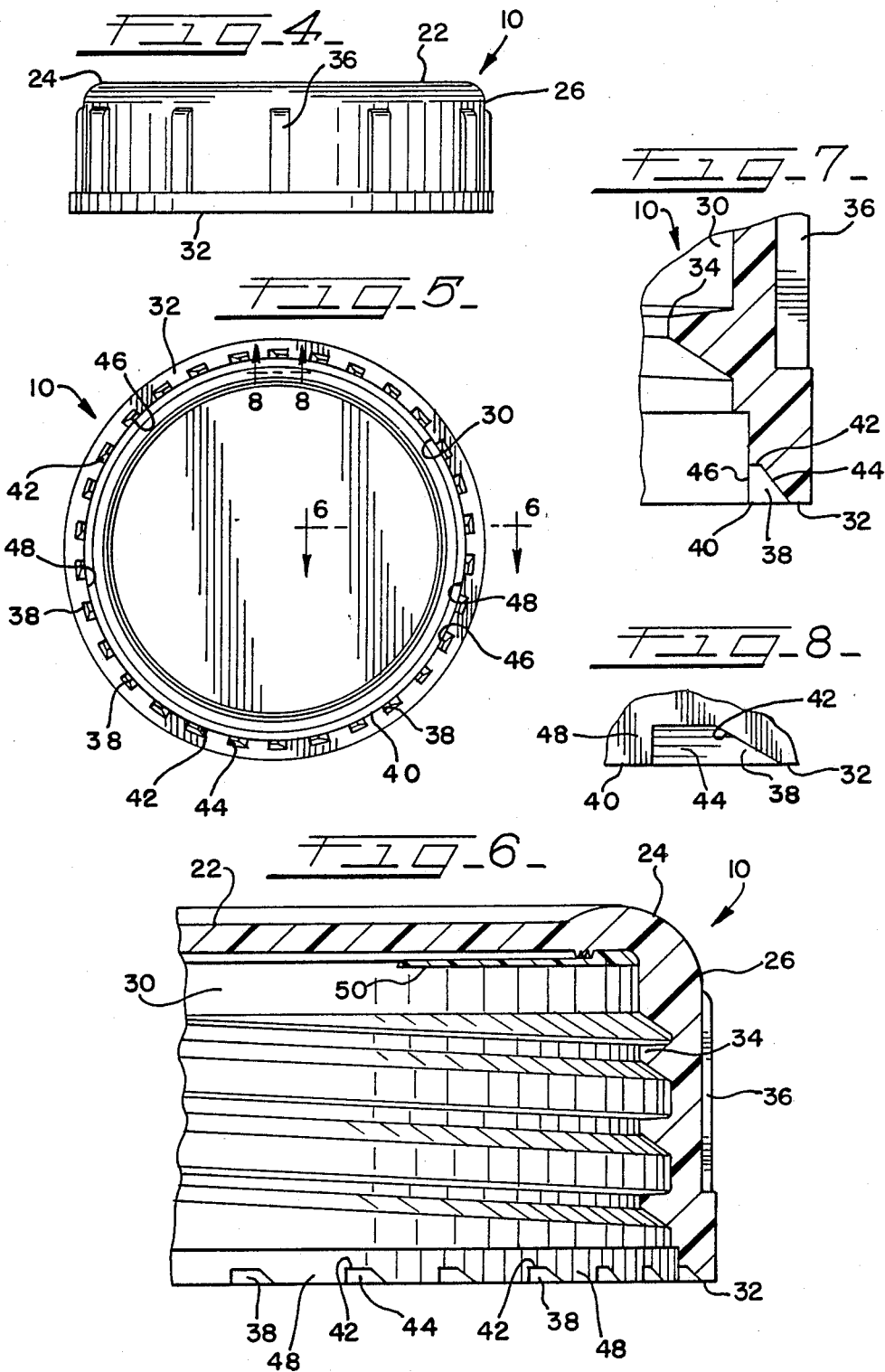

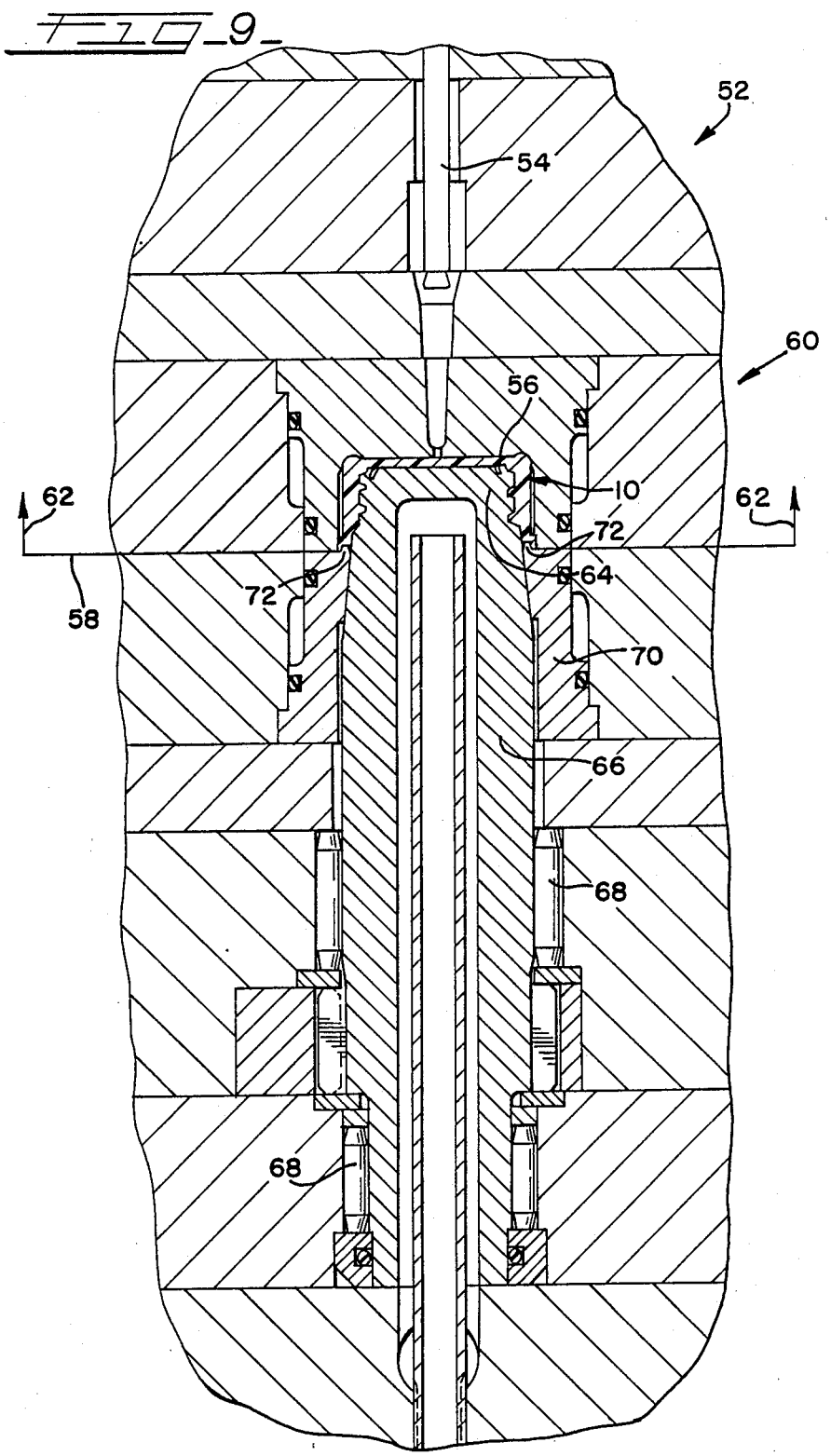
FIG_9

BACK-OFF RESISTANT CLOSURE FOR A CONTAINER

BACKGROUND OF THE INVENTION

The present invention relates to plastic closures for use on bottles or like containers, and specifically to a plastic closure having a plurality of formations for matingly engaging corresponding ratchet formations on the container to prevent backing-off of the closure when the container and closure are in a closed position.

Molded plastic containers of the type employing a threaded closure member, such as bottles, jars, or the like normally include a smooth integral thread formed on the neck portion of the container. When a closure having a corresponding thread is tightened upon the smooth thread of the molded plastic container, there is a tendency for the closure to become loose. This loosening of the closure, commonly known as "backing-off", is due in part to vibration incurred during shipping and handling, to the self-lubricating qualities of the plastic materials normally used in molding the closures and containers, as well as to the tendency of such materials to flow or creep under stress, thereby permitting the closure to work itself off to relieve the stress set up in the threads due to tightening of the closure on the container.

Backing-off can be a significant problem to packagers, in that containers having closures which are loose or appear to have been opened are less apt to be selected by consumers for fear of tampering and/or contamination.

One suggested solution to the problem of backing-off is disclosed in U.S. Pat. No. 3,297,185, in which the lower edge margins of the threads on the container are provided with spaced depending appendages, the distal edges of which form a second load bearing surface which engages the threaded portion of a closure.

U.S. Pat. Nos. 4,345,691 and 3,924,769 disclose closures generally designed for a single use and having inwardly projecting tooth formations for engaging tooth or ratchet formations located on the neck of the closure to prevent inadvertent opening of the closure.

U.S. Pat. No. 3,977,557 discloses a two-piece container closure, the lower portion of which serves as a locking ring, and which may be provided with vertically depending auxiliary ridges which tend to bite into or engage an opposing surface in the container in such a manner as to hold the locking ring against rotation. However, the locking ring is provided in a separate piece from the actual closure itself.

A further problem with conventional container closures, especially molded plastic caps, is that the lower edge of the cap must be provided with a series of some sort of recesses to engage the lugged stripper bushing of a conventional "unscrewing" type of injection molding machinery to facilitate the removal of the cap from the mold. In applications where a molded cap is used to enclose a container having locking formations on its neck threads, such recesses may interfere with the locking action of the closure upon the container.

Thus, it is an object of the present invention to provide a back-off resistant closure for a container having laterally projecting locking formations, the closure having formations which matingly engage the locking formations of the container surface to prevent the backing-off of the closure therefrom without the use of a separate locking ring.

SUMMARY OF THE INVENTION

Accordingly, a one-piece, reusable back-off resistant closure for a container is provided having formations for holding the closure against backing-off by engaging mating ratchet-type locking formations on the container neck. More specifically, the closure of the invention includes a generally planar top portion with an outer peripheral edge, and an annular skirt depending from the peripheral edge, the skirt having a lower edge margin provided with a plurality of open-bottomed recess formations, each recess having an open side and configured for engaging outwardly-projecting ratchet formations on the container. This engagement acts to prevent unwanted backing-off of the closure upon the container. The recesses also facilitate the removal of the closure from the unscrewing type of injection molding machinery preferably used to produce the closure. In addition, the closure is molded of relatively lightweight, flexible plastic material to enable the closure to be squeezably deformed by the user to disengage the recesses from the ratchet formations and release the closure from the container.

BRIEF DESCRIPTION OF THE DRAWINGS

FIG. 1 is a front perspective elevational view of the closure of the invention shown exploded away from the neck of the container;

FIG. 2 is a fragmentary vertical sectional view of the closure of the invention shown in a closed and locked position upon the container of FIG. 1;

FIG. 3 is a fragmentary perspective elevational view of the interior of the present container shown exploded away from the ratchet formations;

FIG. 4 is a front elevational view of the closure of FIG. 1;

FIG. 5 is a bottom elevational view of the closure of FIG. 1;

FIG. 6 is a vertical sectional view taken along the lines 6—6 of FIG. 5 and in the direction generally indicated;

FIG. 7 is a fragmentary sectional view of the closure depicted in FIG. 1;

FIG. 8 is a fragmentary elevational view taken along the line 8—8 of FIG. 5 and in the direction generally indicated; and FIG. 9 is a fragmentary vertical sectional view of an injection molding machine used to manufacture the closure of the invention.

DESCRIPTION OF THE PREFERRED EMBODIMENT

Referring now to FIG. 1, the closure of the invention is designated generally 10, and is shown mounted upon a container generally designated 12. The container 12 has a shoulder portion 14 including a vertically projecting tubular neck portion 16 having a ring formation 18 integral therewith. The ring 18 has a plurality of radially outwardly projecting tooth or ratchet formations 20. Although the formations 20 are shown in groups of three, the precise number and spacing of the formations may vary with the particular application. The neck portion 18 is also provided with a helical thread 21 which is integrally formed therewith. The container 12 is preferably manufactured out of a polymeric material which is thermoformable, including, but not restricted to, polyethylene or polypropylene.

The closure 10 is generally configured as a cap having a generally planar top portion 22 with an outer peripheral edge 24 and a depending annular skirt portion 26 depending from the edge 24. The skirt 26 includes an outer face 28, an inner face 30 (best seen in FIG. 6) and a lower edge 32. The inner face 30 is provided with integrally formed helical threads 34 (best seen in FIG. 2) which are designed to matingly engage the threads 21 of the container 12. The outer face 28 may be provided with a plurality of vertical ribs 36 to allow the closure 10 to be installed upon a container by automatic capping equipment, as well as to facilitate gripping or manipulation by the user.

Referring now to FIGS. 3, and 5-8, the lower edge 32 of the closure 10 is provided with a plurality of spaced, open-bottomed recess formations 38 which are designed to matingly engage the ratchet formations 20 of the ring 18, as well as to assist the removal of the closure from the mold during manufacturing. In the preferred embodiment, the recesses 38 are provided around the entire lower edge 32, although the exact number and spacing of recesses 38 may vary with the application. The formations 38 are preferably trapezoidal in configuration and are defined by lower edge portion 40 of the closure, a peripheral wall 42 (best seen in FIGS. 5 and 6), a slightly angled outer wall 44 and an open inner side 46. Adjacent recess formations 38 are spaced apart by a trapezoidal tooth formation 48. The arrangement of the lower edges 40 defining the recesses 38 creates a ring of rectangular openings which, with the open inner facing sides 46 of the recess 38, enables the closure 10 to lockingly engage the ratchet formations 20 of the container 12.

Referring now to FIG. 6, the closure lo is shown provided with an upper sealing member or gasket 50. The sealing member 50 is shown in fragmentary fashion because it is an optional feature; however, if employed it would cover the mouth 52 of the container 12.

Referring now to FIG. 9, the closure 10 is preferably manufactured by injection molding using an "unscrewing" type of mold generally designated 52. In this process, the heated plastic is injected through a gate 54 into a mold cavity 56. Subsequent to the cooling of the plastic in the mold cavity 56, the mold 52 is separated along a parting line 58 with a portion 60 of the mold moving in the direction indicated by the arrow 62. Thus, the recently formed closure 10 is left threaded upon the threaded end 64 of a shaft-like core 66. In order to remove the closure 10 from the end 64 of the core 66, the core rotates axially upon roller bearings 68. A conventional lugged stripper bushing 70 having a plurality of vertically projecting lugs 72 secures the closure 10 against axial rotation, while moving the closure distally relative to the core 66. In order to prevent the movement of the closure 10 relative to the core 66, the lugs 72 of the stripper bushing 70 engage the recesses 38 of the closure 10 (best seen in FIG. 5). Once the stripper bushing moves the closure 10 past the end 64 of the core 66, the closure falls free of the mold.

The closure 10 is preferably molded of a lightweight plastic material which is flexible and squeezably, resiliently deformable. Thus, when the closure is closed upon the container, as shown in FIG. 2, the user can squeeze the closure so that the tooth formations 48 can ride over the ratchet formations 20 for release of the closure. Despite its deformability, the closure 10 has a "memory", in that once the user ceases the squeezing action, the closure 10 immediately resumes its original configuration.

In operation, and referring to FIGS. 1-3, the closure 10 is threaded upon the neck 18 of the container 12 with the threads 34 of the closure engaging the threads 21 of the neck 18. Once the lower edge 32 of the skirt 26 is placed in closely adjacent relationship with the ratchets 20 of the ring 18, the closure 10 may be tightened about the container 12, with the recesses 38 contacting the ratchet formations 20 of the container 12. This tightening action causes an audible and tactile vibration between the formations 20 and the recess peripheries 42, which indicates to the user that the closure 10 is locked upon the container 12.

When the closure 10 is snugly secured upon the container neck 16, the ratchets 20 matingly engage the recesses 38. In this manner, the closure is prevented against back-off motion which may cause the closure to slightly open. While the closure 28 may be somewhat difficult to open by some consumers, it does not provide excessive resistance to opening. To effect removal from the container 12, it is not necessary to apply axial pressure to the closure 10 in a "push-and twist" motion due to its resiliently deformable construction.

It is possible that when the closure 10 is closed on the container that the tooth formations 48 on the closure will engage the ratchet formations 20 on the container 12. In addition, the recesses 38 on the closure and gaps between the ratchets 20 will be located immediately opposite one another. While this position is not desirable, it will occur particularly when the closure is tightened upon the container by machine. When this occurs, the closure may back-off slightly relative to the container as the result of vibrations during transit or otherwise, to the point where the ratchet formations 20 of the container 12 engage the recesses 38 of the container 10 and vice-versa. Generally, this backing-off movement will be so minuscule that a safe seal will still be maintained and no contamination or spoilage of the product located within the container will result. The degree of tightness of the closure on the container can be controlled and regulated by the amount of torque applied by the capping machine.

Of course, sometimes the closure 10 will engage the container 12 in a closed position where the teeth 48 of the closure and the ratchet formations 20 of the container 12 engage one another but are not directly opposite. This will also result in a slight backing-off of the closure 10 relative to the container 12 to the point where the ratchet formations 20 engage the immediately adjacent recesses 38. Again, this slight backing-off should not result in any contamination or spoilage of any product located within the container. A further advantage of the present closure is that after the initial opening of the container, the closure may be repeatedly secured upon the container to preserve the container contents.

While a particular embodiment of the closure of the invention has been shown and described, it will be appreciated by those skilled in the art that changes and modifications may be made thereto without departing from the invention in its broader aspects and as set forth in the following claims.

I claim:

1. A molded back-off resistant closure and container combination, the combination comprising:

a container having a neck with a plurality of radially outwardly projecting ratchet formations;

a closure having a generally planar top portion with an outer peripheral edge;

an annular skirt depending from said peripheral edge, said skirt having an inner face provided with integral threads and a lower edge provided with a plurality of open-bottom recesses, adjacent recesses being spaced apart by inwardly projecting, trapezoidal tooth formations, each said recess also being open and generally trapezoidal in shape on an inner side for facilitating the removal of said closure from a mold and for matingly engaging said ratchet formations of said container to prevent backing-off of said closure, said skirt having an outer face provided with a plurality of spaced, parallel, vertically positioned ribs.

2. The closure as defined in claim 1 wherein said top portion and said skirt are molded of flexible plastic so as to be squeezably and resiliently deformable.

* * * * *